United States Patent
Lu et al.

(10) Patent No.: US 9,812,950 B2
(45) Date of Patent: Nov. 7, 2017

(54) PFC CONTROL CIRCUIT, DIGITAL PFC CIRCUIT AND THE METHOD THEREOF

(71) Applicant: Chengdu Monolithic Power Systems Co., Ltd., Chengdu (CN)

(72) Inventors: Wenbin Lu, Hangzhou (CN); Sicong Lin, Hangzhou (CN); Qiming Zhao, Hangzhou (CN); Lijie Jiang, Hangzhou (CN); Guangchao Zhang, San Jose, CA (US)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 200 days.

(21) Appl. No.: 14/737,459

(22) Filed: Jun. 11, 2015

(65) Prior Publication Data

US 2015/0364988 A1    Dec. 17, 2015

(30) Foreign Application Priority Data

Jun. 11, 2014  (CN) .......................... 2014 1 0257725

(51) Int. Cl.
*H02M 1/42* (2007.01)
*H02M 1/00* (2006.01)

(52) U.S. Cl.
CPC ........ *H02M 1/4208* (2013.01); *H02M 1/4225* (2013.01); *H02M 2001/0012* (2013.01); *Y02B 70/126* (2013.01)

(58) Field of Classification Search
CPC ........ H02M 1/4208; H02M 2001/0012; Y02B 70/126
See application file for complete search history.

(56) References Cited

U.S. PATENT DOCUMENTS

| 5,856,917 | A | * | 1/1999 | Aonuma | H02M 1/4225 323/222 |
| 2005/0270813 | A1 | * | 12/2005 | Zhang | H02M 1/4225 363/89 |
| 2012/0146529 | A1 | * | 6/2012 | Campbell | H02M 1/10 315/210 |
| 2014/0003105 | A1 | | 1/2014 | Lin et al. | |
| 2014/0285163 | A1 | | 9/2014 | Lin et al. | |
| 2015/0180331 | A1 | | 6/2015 | Lin | |
| 2015/0303790 | A1 | | 10/2015 | Lin et al. | |

OTHER PUBLICATIONS

Konstantin P. Louganski and Jih-Sheng Lai, "Active Compensation of the Input Filter Capacitor Current in Single-Phase PFC Boost Converters", 2006 IEEE COMPEL Workshop, Rensselaer Polytechnic Institute, Troy, NY, USA, Jul. 16-19, 2006.*
Zhong Ye and Bosheng Sun, "Advanced Digital Controls Improve PFC Performance," Texas Instruments SLUP310, 2012.*

* cited by examiner

*Primary Examiner* — Jue Zhang
*Assistant Examiner* — Jye-June Lee
(74) *Attorney, Agent, or Firm* — Perkins Coie LLP

(57) ABSTRACT

A digital PFC circuit with improved power factor is described. The digital PFC circuit uses a compensation current generating unit and a reference current adjust unit to eliminate the effect of a current flowing through an input capacitor to the input current, so that the input current and the input line voltage of the digital PFC circuit are controlled to be in-phase.

13 Claims, 6 Drawing Sheets

US 9,812,950 B2

PFC CONTROL CIRCUIT, DIGITAL PFC CIRCUIT AND THE METHOD THEREOF

TECHNICAL FIELD

The present invention relates to electronic circuits, more specifically, the present invention relates to digital power factor correction (PFC) circuit and the method thereof.

BACKGROUND

PFC circuits are widely used in power converting systems to correct the phase of the input current to improve the power factor and to reduce the power loss. The definition of power factor (PF) is the ratio of average power to apparent power, i.e.:

$$PF = \frac{\text{average power}}{\text{apparent power}} = \cos\theta \frac{1}{\sqrt{1+THD^2}}$$

wherein $\theta$ represents the phase difference between the input line voltage and the input current, and THD represents the total harmonic distortion of the input current. Controlling the phase difference $\theta$ to be zero is highly required.

FIG. 1 schematically shows a traditional PFC circuit 50. As shown in FIG. 1, the PFC circuit 50 comprises: a first input port 11 and a second input port 12, configured to receive an input line voltage $V_{in}$, wherein the input line voltage is typically a sine wave; a rectifier 13, coupled to the first input port 11 and the second input port 12 to rectify the input line voltage $V_{in}$ to a rectified voltage $V_z$ (i.e., a half sine wave); an input capacitor 14, coupled between the rectifier 13 and a reference ground; a power switch circuit 15 including at least a power switch, wherein the power switch circuit 15 is coupled to the rectifier 13 to receive the rectified voltage $V_z$, and to generate a desired output voltage $V_O$ to power a load based on the rectified voltage $V_z$; and a control circuit 16, configured to receive a voltage sense signal $V_{ifb}$ indicative of the input line voltage $V_{in}$, a current sense signal indicative of a current flowing through the power switch circuit 15, and the output voltage $V_O$, to generate a control signal to control the power switch, so as to get the desired output voltage $V_O$.

When the PFC circuit 50 is in operation, there is a current $i_c$ flowing through the input capacitor 14. However, the control circuit 16 is configured to receive the current sense signal indicative of the current flowing through the power switch circuit 15, but not to receive an input current $i_{in}$ of the PFC circuit 50. So the current flowing through the power switch circuit 15 is corrected to be in-phase with the input line voltage $V_{in}$ and/or with the rectified voltage $V_z$ by the PFC circuit 50. The timing waveforms of the input current $i_{in}$ in the PFC circuit 50, the current $i_c$ flowing through the input capacitor 14, the current $i_s$ flowing through the power switch circuit 15, and the rectified voltage $V_z$ are shown in FIG. 2. That is, there still exists relatively large phase difference between the input current and the input line voltage under traditional PFC control. FIG. 3 schematically shows the phase diagrams of the input line voltage $V_{in}$, the current $i_s$ flowing through the power switch circuit 15, the current $i_c$ flowing through the input capacitor 14 and the input current $i_{in}$ in the PFC circuit 50.

As a result, the input capacitor influences the power factor as well as the THD in prior art. The higher the capacitance of the input capacitor, the lower the power factor, especially under light load condition.

SUMMARY

A digital PFC circuit having a compensation current generating unit and a reference current adjust unit to eliminate the effect of an input capacitor to the power factor is disclosed.

The use of the similar reference label in different drawings indicates the same of like components.

DETAILED DESCRIPTION

Embodiments of digital PFC circuit and the method thereof are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 1:
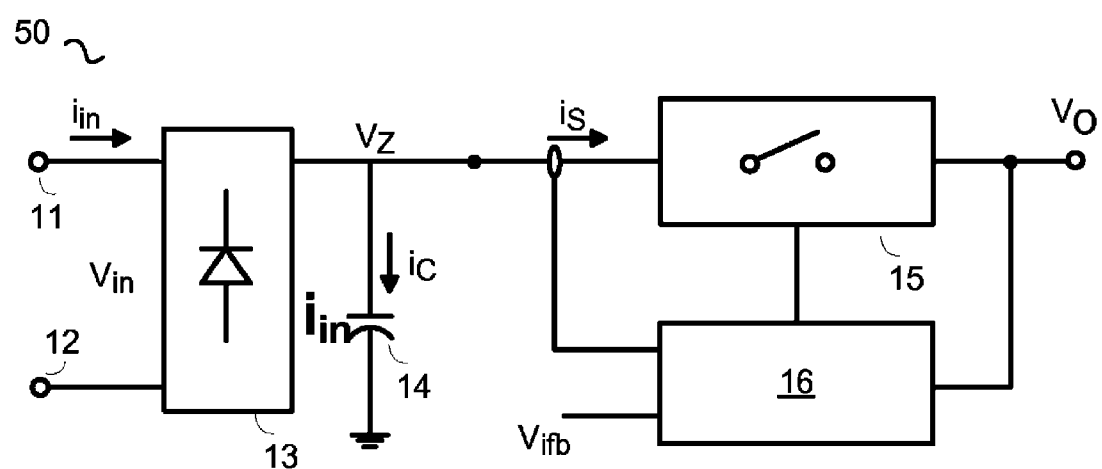
FIG. 1 schematically shows a traditional PFC circuit 50.
Figure 2:
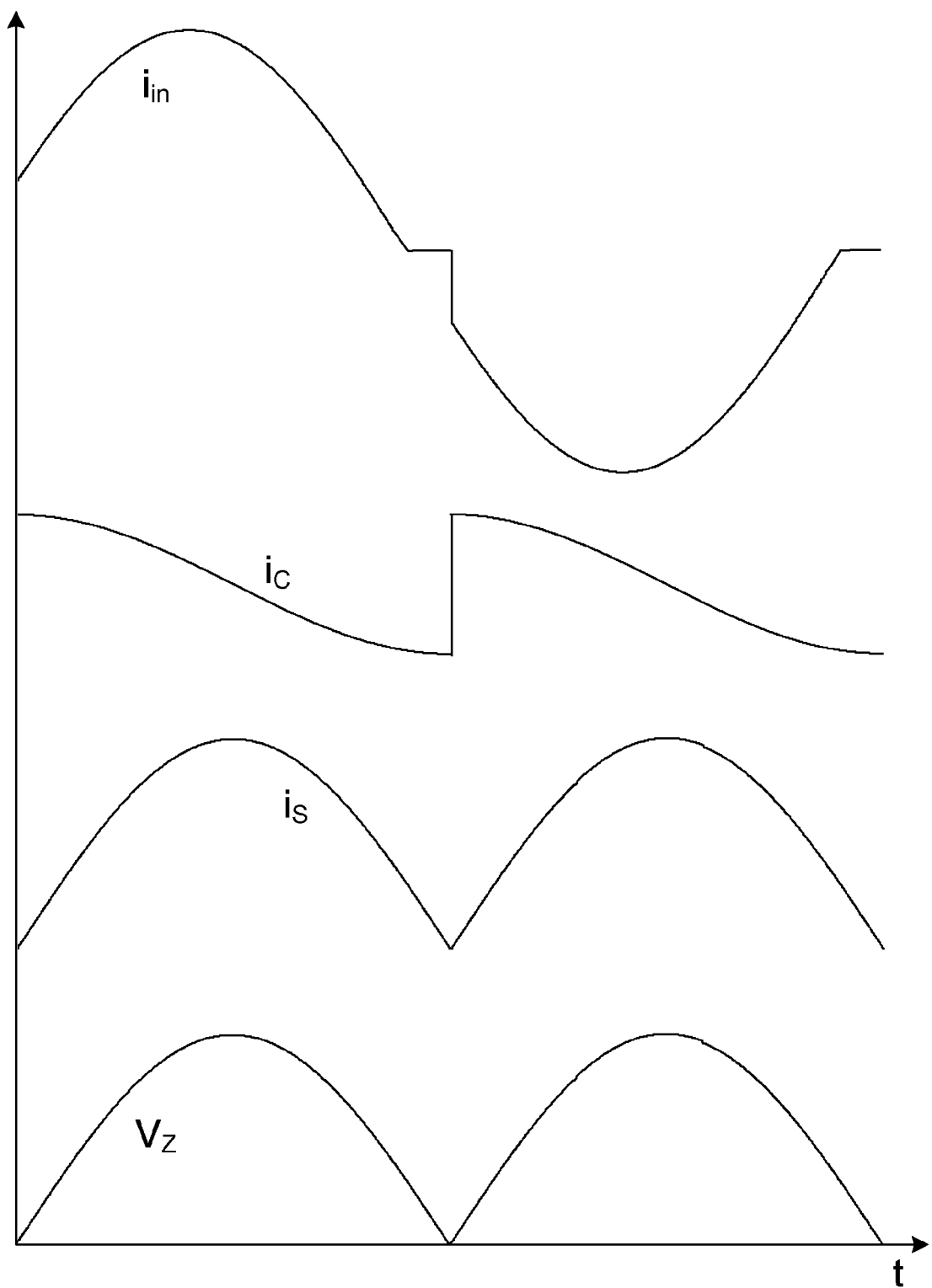
FIG. 2 schematically shows timing waveforms of the input current $i_{in}$, the current $i_c$ flowing through the input capacitor 14, the current $i_s$ flowing through the power switch circuit 15, and the rectified voltage $V_z$ in the PFC circuit 50.
Figure 3:
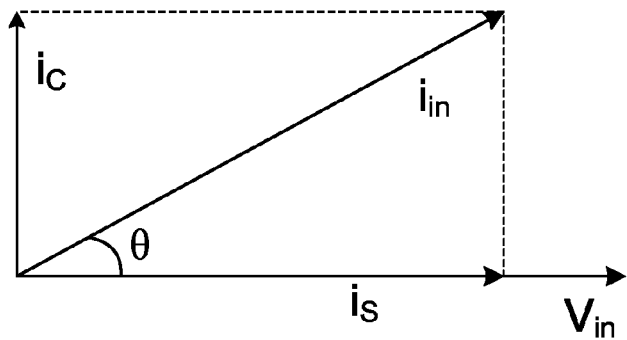
FIG. 3 schematically shows the phase diagrams of the input line voltage $V_{in}$, the current $i_s$ flowing through the power switch circuit 15, the current $i_c$ flowing through the input capacitor 14 and the input current $i_{in}$ in the PFC circuit 50.
Figure 4:
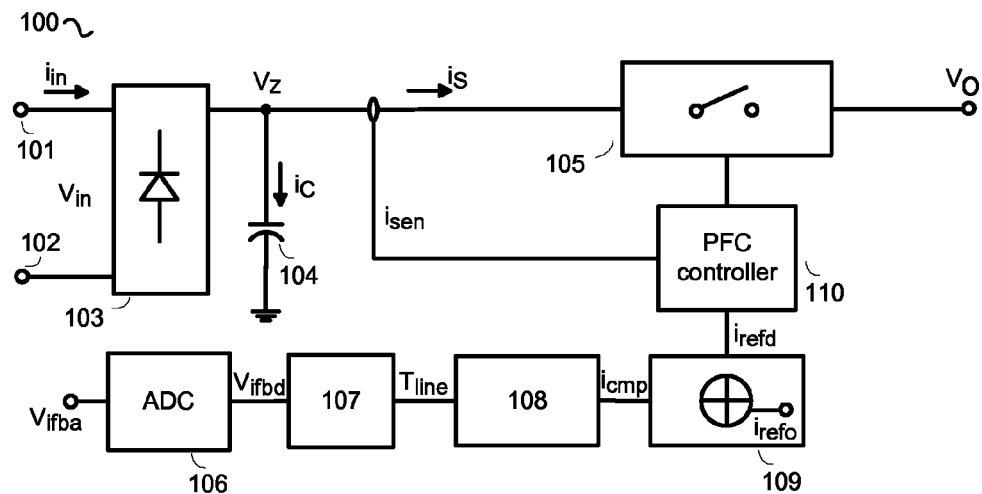
FIG. 4 schematically shows a digital PFC circuit 100 in accordance with an embodiment of the present invention.

FIG. 4 schematically shows a digital PFC circuit 100 in accordance with an embodiment of the present invention. In the example of FIG. 4, the digital PFC circuit 100 comprises: a first input port 101 and a second input port 102, configured to receive an input line voltage $V_{in}$, wherein the input line voltage is typically a sine wave; a rectifier 103, coupled to the first input port 101 and the second input port 102 to rectify the input line voltage $V_{in}$ to a rectified voltage $V_Z$; an input capacitor 104, coupled between the rectifier 103 and a reference ground; a power switch circuit 105 including at least a power switch, wherein the power switch circuit 105 is coupled to the rectifier 103 to receive the rectified voltage $V_Z$, and to generate a desired output voltage $V_O$ to power a load based on the rectified voltage $V_Z$; an analogue to digital (ADC) unit 106, configured to receive a feed forward signal $V_{ifbd}$ indicative of the input line voltage $V_{in}$, to generate a digital voltage signal $V_{ifbd}$; a cycle calculating unit 107, configured to receive the digital voltage signal $V_{ifbd}$ provided by the analogue to digital unit 106, to calculate the cycle of the input line voltage $V_{in}$ to generate a cycle signal $T_{line}$; a compensation current generating unit 108, configured to receive the cycle signal $T_{line}$ provided by the cycle calculating unit 107, to generate a compensation current $i_{cmp}$, wherein the compensation current $i_{cmp}$ is complementary to a current flowing through the input capacitor 104, i.e., $i_{cmp}$=ic; a reference current adjust unit 109, configured to receive the compensation current $i_{cmp}$ provided by the compensation current generating unit 108, to execute an operation on the compensation current $i_{cmp}$ and an original reference current signal $i_{refo}$, to generate an adjusted reference current signal $i_{refd}$; and a PFC controller 110, configured to receive the adjusted reference current signal $i_{refd}$ provided by the reference current adjust unit 109 and a current sense signal $i_{sen}$ indicative of a current flowing through the power switch circuit 105, to generate a logical control signal to control the operation of the power switch.

In one embodiment, the reference current adjust unit 109 comprises an operation unit (e.g., a summator as shown in FIG. 4).

Figure 5:
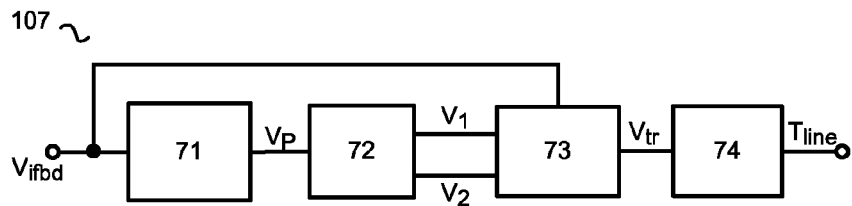
FIG. 5 schematically shows a digital logic module diagram of the cycle calculating unit 107 in accordance with an embodiment of the present invention.

FIG. 5 schematically shows a digital logic module diagram of the cycle calculating unit 107 in accordance with an embodiment of the present invention. In the example of FIG. 5, the cycle calculating unit 107 comprises: a peak detecting module 71, configured to receive the digital voltage signal $V_{ifbd}$ provided by the analogue to digital unit 106, to detect the peak value of the digital voltage signal $V_{ifbd}$, to generate a peak signal $V_P$; a threshold setting module 72, configured to receive the peak signal $V_P$ provided by the peak detecting module 71, to generate a first threshold $V_1$ and a second threshold $V_2$ with close voltage levels (e.g., $V_1=V_2+0.1V$), wherein both the first threshold $V_1$ and the second threshold $V_2$ are lower than the peak signal $V_P$, i.e., $0<V_2<V_1<V_P$; a threshold detecting module 73, configured to receive the first threshold $V_1$ and the second threshold $V_2$ provided by the threshold setting module 72, and configured to receive the digital voltage signal $V_{ifbd}$ provided by the analogue to digital module 106, to generate a trig signal $V_{tr}$ when the digital voltage signal $V_{ifbd}$ at its right half cycle is between the first threshold $V_1$ and the second threshold $V_2$; and a time counter module 74, configured to receive the trig signal $V_{tr}$ provided by the threshold detecting module 73, to generate the cycle signal $T_{line}$, wherein the time interval of the successive two beings between the first threshold $V_1$ and the second threshold $V_2$ of the digital voltage signal $V_{ifbd}$ at its right half cycle is the cycle of the input line voltage $V_{in}$.

Figure 6:
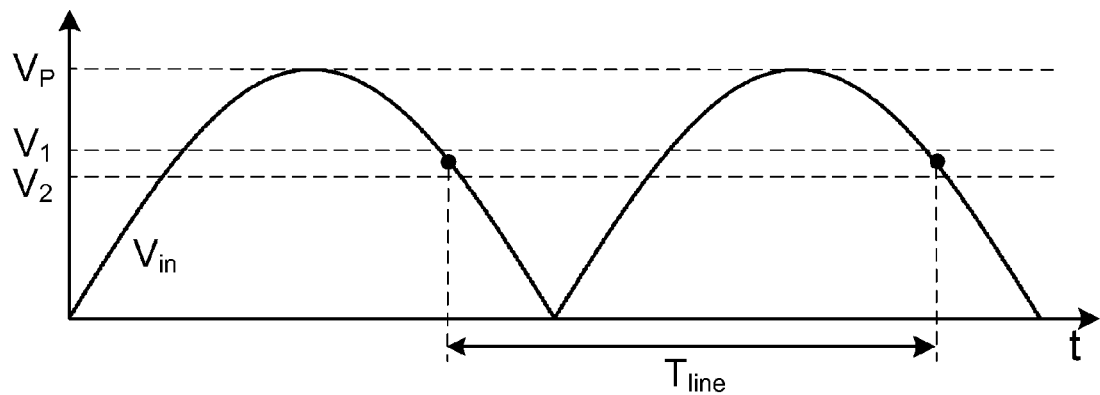
FIG. 6 schematically shows a waveform of the operation principle of the cycle calculating unit 107 shown in FIG. 5.

FIG. 6 schematically shows a waveform of the operation principle of the cycle calculating unit 107 shown in FIG. 5.

In typical application, the input line voltage $V_{in}$ is usually a sine voltage, i.e.

$$V_{in}=\sqrt{2}\times V_r \times \sin(2\times \pi \times f \times t) \qquad (1)$$

wherein $V_r$ represents the root mean square (RMS) of the input line voltage $V_{in}$, f represents the frequency of the input line voltage $V_{in}$, and t represents time.

Then the current flowing through the input capacitor 104 is:

$$i_C = C_{104} \times \frac{dV_{104}}{dt} = 2\times \pi \times f \times C_{104} \times \sqrt{2} \times V_r \times \cos(2\times \pi \times f \times t) \qquad (2)$$

wherein $C_{104}$ represents the capacitance of the input capacitor 104, and $V_{104}$ represents a voltage drop across the input capacitor 104.

So the compensation current $i_{cmp}$ would be:

$$i_{cmp}=-i_C=-2\times \pi \times f \times C_{104}\times\sqrt{2}\times V_r\times\cos(2\times\pi\times f\times t) \qquad (3)$$

As shown in expression (3), the compensation current $i_{cmp}$ is also a sine signal. However, in digital system, all signals are dispersed to digital sequences. Two methods which realize the above compensation current $i_{cmp}$ are discussed in the following text.

(i). Using a Quasi-Sine Wave to Realize the Compensation Current $i_{cmp}$.

Figure 7:
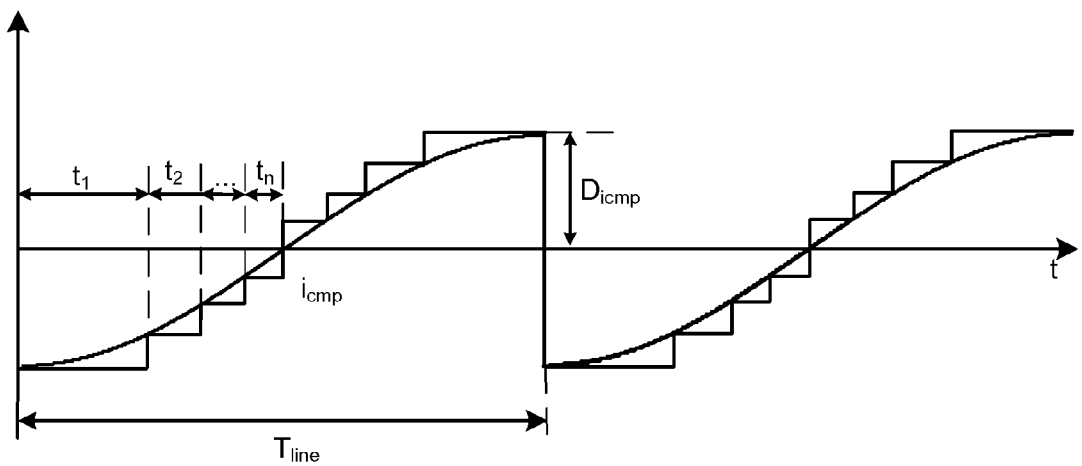
FIG. 7 schematically shows principle waveforms by using a quasi-sine wave to realize the compensation current $i_{cmp}$.

As shown in FIG. 7, dividing amplitude of the compensation current $i_{cmp}$ into $D_{icmp}$ steps at each half cycle of the quasi-sine wave, wherein $D_{icmp}$ is the amplitude of the quasi-sine wave. That is, each step has same sub-amplitude. Then $$D_{icmp} = 2\times \pi \times f \times C_{104} \times \sqrt{2} \times V_r \times \frac{2^N - 1}{V_{adc\_ref}} \qquad (4)$$

wherein $V_{adc\_ref}$ represents a reference voltage of the analogue to digital unit 106, and N represents a data bit of the analogue to digital unit 106.

And the time interval of each step $t_n$ is:

$$t_n = \frac{\arccos\left(\frac{D_{icmp}-n}{D_{icmp}}\right) - \arccos\left(\frac{D_{icmp}+1-n}{D_{icmp}}\right)}{\pi} \times T_{line} (n=1\ldots D_{icmp}) \qquad (5)$$

So digitally programming the amplitude $D_{icmp}$ of the quasi-sine wave and the time interval $t_n$ of each step as expressions (4) and (5), desired compensation current $i_{cmp}$ is get.

Figure 8:
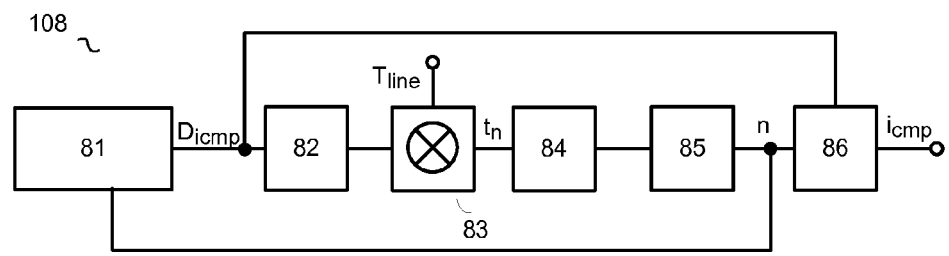
FIG. 8 schematically shows a digital logical module diagram of the compensation current generating unit 108 which realizes the waveform shown in FIG. 7 in accordance with an embodiment of the present invention.

FIG. 8 schematically shows a digital logical module diagram of the compensation current generating unit 108 which realizes the waveform shown in FIG. 7 in accordance with an embodiment of the present invention. In the example of FIG. 8, the compensation current generating unit 108 comprises: a quasi-sine wave amplitude calculating module 81, configured to generate an amplitude $D_{icmp}$ in light of the RMS $V_r$ of the input line voltage $V_{in}$, the frequency f of the input line voltage $V_{in}$, the capacitance $C_{104}$ of the input capacitor 104, the reference voltage $V_{adc\_ref}$ of the analogue to digital unit 106 and the data bit N of the analogue to digital unit 106, i.e., generate the amplitude $D_{icmp}$ according to expression (4); a storage module 82, configured to receive the amplitude $D_{icmp}$ provided by the quasi-sine wave amplitude calculating module 81 and a current step n, to provide a circular function value, i.e. to provide the value of $$\frac{\arccos\left(\frac{D_{icmp}-n}{D_{icmp}}\right) - \arccos\left(\frac{D_{icmp}+1-n}{D_{icmp}}\right)}{\pi};$$

an operation module 83, configured to receive the circular function value provided by the storage module 82 and the cycle signal $T_{line}$ provided by the cycle calculating unit 107, to calculate the time interval $t_n$ of the current step, i.e. to provide the time interval $t_n$ of the current step according to expression (5); a timing module 84, configured to receive the time interval $t_n$ of the current step, to generate a pulse signal after timing for the time interval $t_n$ of the current step; a counting module 85, configured to receive the pulse signal provided by the timing module 84, to generate the current step n; and a subtract module 86, configured to receive the amplitude $D_{icmp}$ provided by the quasi-sine wave amplitude calculating module 81 and the current step n, to execute subtract operation on the amplitude $D_{icmp}$ and the current step n, to generate the compensation current $i_{cmp}$.

In one embodiment, the operation module 83 comprises a multiplier.

However, an inverse circular function table is needed to calculate the time interval of each step by using above quasi-sine wave method, which needs large memory.

(ii). Using a Saw-Tooth Wave to Realize the Compensation Current $i_{cmp}$.

Figure 9:
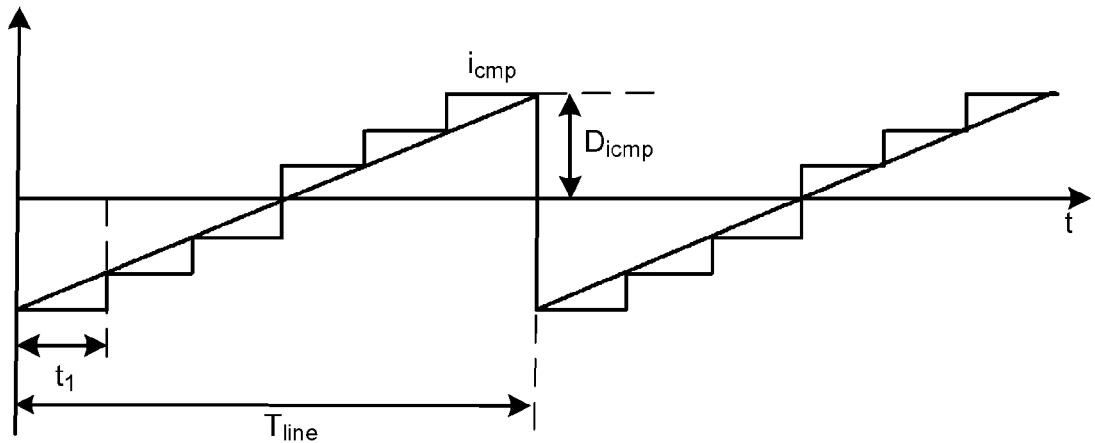
FIG. 9 schematically shows principle waveforms by using a saw-tooth wave to realize the compensation current $i_{cmp}$.

As shown in FIG. 9, setting a fundamental wave of the saw-tooth wave to be complementary to the current $i_c$ flowing through the input capacitor. As known from Fourier transform, the amplitude $D_{icmp}$ of the saw-tooth wave is $8/\pi^2$ times of the amplitude of the fundamental wave. So the amplitude $D_{icmp}$ of the saw-tooth wave is:

$$D_{icmp} = \frac{\pi^2}{8} \times 2 \times \pi \times f \times C_{104} \times \sqrt{2} \times V_r \times \frac{2^N - 1}{V_{adc\_ref}} \rightarrow \quad (6)$$

$$D_{icmp} = \frac{\sqrt{2} \times \pi^3 \times f \times C_{104} \times V_r \times (2^N - 1)}{4 \times V_{adc\_ref}} \quad (7)$$

Dividing the amplitude into $D_{icmp}$ steps at each half of the saw-tooth wave, then the time interval $t_n$ of each step is:

$$t_n = \frac{T_{line}}{2 \times D_{icmp}} \quad (8)$$

Figure 10:
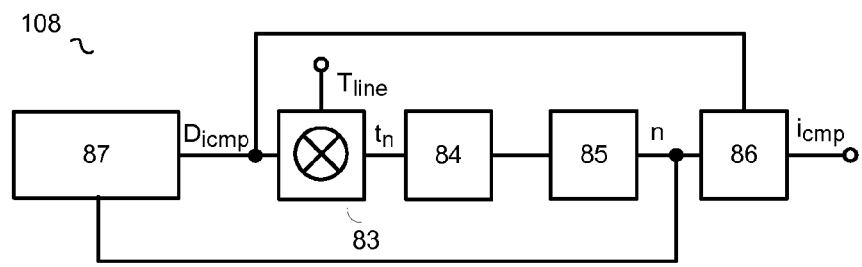
FIG. 10 schematically shows a digital logical module diagram of the compensation current generating unit 108 which realizes the waveform shown in FIG. 9 in accordance with an embodiment of the present invention.

FIG. 10 schematically shows a digital logical module diagram of the compensation current generating unit 108 which realizes the waveform shown in FIG. 9 in accordance with an embodiment of the present invention. In the example of FIG. 10, the compensation current generating unit 108 comprises: a saw-tooth wave amplitude calculating module 87, configured to generate an amplitude $D_{icmp}$ in light of the RMS $V_r$ of the input line voltage $V_{in}$, the frequency f of the input line voltage $V_{in}$, the capacitance C104 of the input capacitor 104, the reference voltage $V_{adc\_ref}$ of the analogue to digital unit 106 and the data bit N of the analogue to digital unit 106, i.e., generate the amplitude $D_{icmp}$ according to expression (7); an operation module 83, configured to receive the amplitude $D_{icmp}$ provided by the saw-tooth wave amplitude calculating module 87 and the cycle signal $T_{line}$ provided by the cycle calculating unit 107, to calculate the time interval $t_n$ of each step, i.e. to provide the time interval $t_n$ of each step according to expression (8); a timing module 84, configured to receive the time interval $t_n$ of each step, to generate a pulse signal after timing for the time interval $t_n$ of each step; a counting module 85, configured to receive the pulse signal provided by the timing module 84, to generate the current step n; a subtract module 86, configured to receive the amplitude $D_{icmp}$ provided by the saw-tooth wave amplitude calculating module 87 and the current step n, to execute subtract operation on the amplitude $D_{icmp}$ and the current step n, to generate the compensation current $i_{cmp}$.

The time interval $t_n$ of each step is same, so only detecting the cycle of the input line voltage $V_{in}$ is needed by using above saw-tooth wave method. So the saw-tooth wave method is easily to execute.

The compensation current $i_{cmp}$ is then delivered to the reference current adjust unit 109, to be added to the original reference current signal $i_{refo}$, to get the adjusted reference current signal $i_{refd}$. The adjusted reference current signal $i_{refd}$ is delivered to the PFC controller 110, to control the current flowing through the power switch circuit 105 be proportional to the adjusted reference current signal $i_{refd}$. Because the compensation current $i_{cmp}$ has been added to the original reference current signal $i_{refo}$, the effect of the current flowing through the input capacitor to the input current is eliminated. So the input current $i_{in}$ and the input line voltage $V_{in}$ of the digital PFC circuit are controlled to be in-phase.

Figure 11:
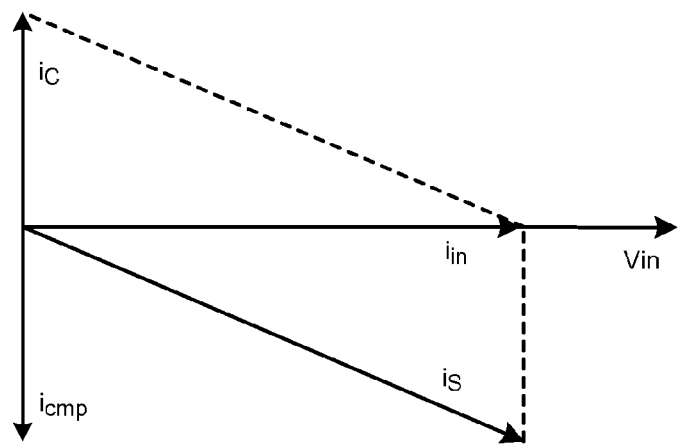
FIG. 11 schematically shows the phase diagrams of the input line voltage $V_{in}$, the current $i_s$ flowing through the power switch circuit 15, the current $i_c$ flowing through the input capacitor 104, the compensation current $i_{cmp}$ and the input current $i_{in}$ in the digital PFC circuit 100.

FIG. 11 schematically shows the phase diagrams of the input line voltage $V_{in}$, the current $i_s$ flowing through the power switch circuit 15, the current $i_c$ flowing through the input capacitor 104, the compensation current $i_{cmp}$ and the input current 4, in the digital PFC circuit 100. As shown in FIG. 11, the input current 4, and the input line voltage $V_{in}$ of the digital PFC circuit 100 is substantially controlled to be in-phase with each other after the compensation of the compensation current $i_{cmp}$. So the power factor of the digital PFC circuit 100 is highly improved.

Figure 12:
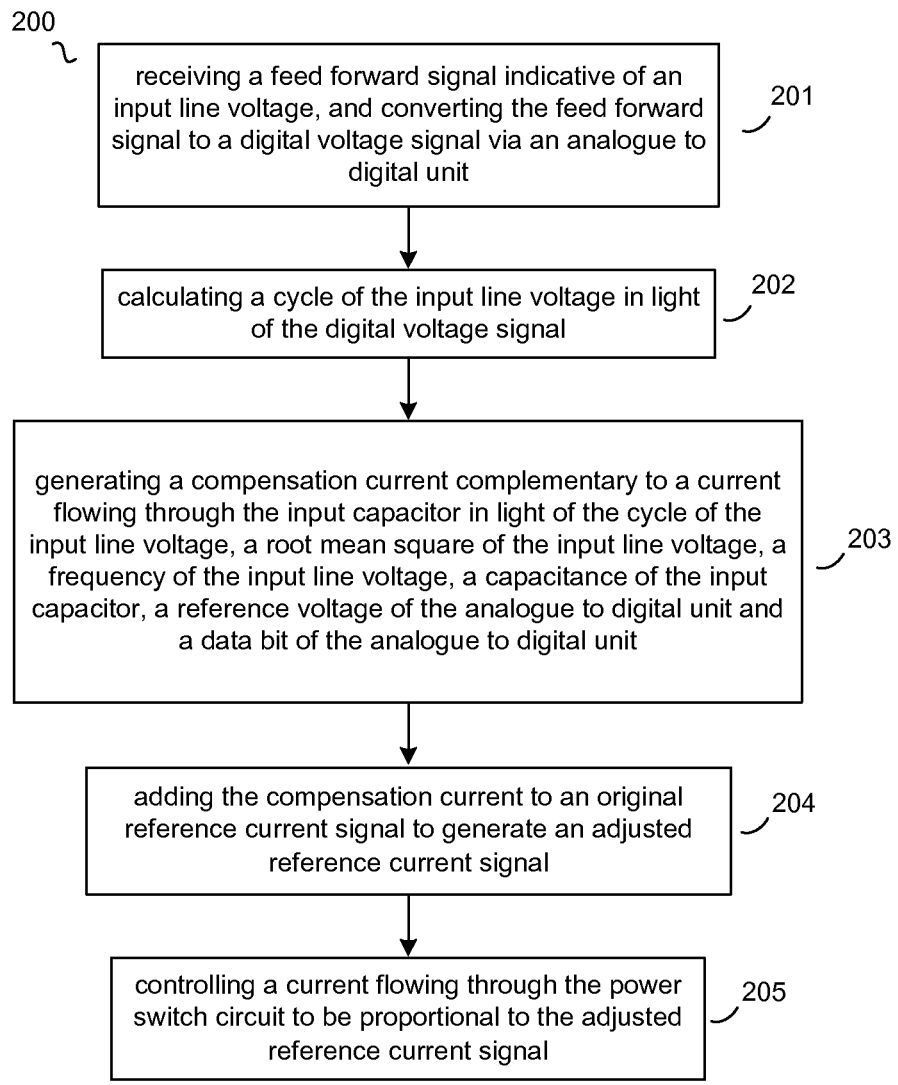
FIG. 12 schematic shows a flowchart 200 of a method used in a digital PFC circuit in accordance with an embodiment of the present invention.

FIG. 12 schematic shows a flowchart 200 of a method used in a digital PFC circuit in accordance with an embodiment of the present invention. The digital PFC circuit comprises an input capacitor and a power switch circuit, the method comprising:

Step 201, receiving a feed forward signal indicative of an input line voltage, and converting the feed forward signal to a digital voltage signal via an analogue to digital unit.

Step 202, calculating a cycle of the input line voltage in light of the digital voltage signal.

Step 203, generating a compensation current complementary to a current flowing through the input capacitor in light of the cycle of the input line voltage, a root mean square of the input line voltage, a frequency of the input line voltage, a capacitance of the input capacitor, a reference voltage of the analogue to digital unit and a data bit of the analogue to digital unit.

Step 204, adding the compensation current to an original reference current signal to generate an adjusted reference current signal. And Step 205, controlling a current flowing through the power switch circuit to be proportional to the adjusted reference current signal.

In one embodiment, the step 202 of calculating a cycle of the input line voltage in light of the digital voltage signal comprises: detecting a peak value of the digital voltage signal; setting a first threshold and a second threshold with close voltage levels based on the digital voltage signal, wherein the first threshold and the second threshold are both lower than the peak value of the digital voltage signal; and calculating a time interval of successive two beings between the first threshold and the second threshold of the digital voltage signal at its right half cycle, to get the cycle of the input line voltage.

In one embodiment, the step 203 of generating a compensation current complementary to a current flowing through the input capacitor in light of the cycle of the input line voltage, a root mean square of the input line voltage, a frequency of the input line voltage, a capacitance of the input capacitor, a reference voltage of the analogue to digital unit and a data bit of the analogue to digital unit comprises: using a quasi-sine wave to generate the compensation current, (i) calculating an amplitude $D_{icmp}$ according to the following expression:

$$D_{icmp} = 2 \times \pi \times f \times C \times \sqrt{2} \times V_r \times \frac{2^N - 1}{V_{adc\_ref}}$$

wherein C represents the capacitance of the input capacitor, $V_r$ represents the root mean square of the input line voltage, f represents the frequency of the input line voltage, $V_{adc\_ref}$ represents the reference voltage of the analogue to digital unit, and N represents the data bit of the analogue to digital unit;

(ii) calculating a time interval $t_n$ of a current step according to the following expression:

$$t_n = \frac{\arccos\left(\frac{D_{icmp} - n}{D_{icmp}}\right) - \arccos\left(\frac{D_{icmp} + 1 - n}{D_{icmp}}\right)}{\pi} \times T_{line} (n = 1 \ldots D_{icmp})$$

wherein $T_{line}$ represents the cycle of the input line voltage, and n represents the current step; and (iii) dividing the amplitude into $D_{icmp}$ steps at each half of the quasi-sine wave, each step having a corresponding time interval as generated at step (ii).

In one embodiment, the step 203 of generating a compensation current complementary to a current flowing through the input capacitor in light of the cycle of the input line voltage, a root mean square of the input line voltage, a frequency of the input line voltage, a capacitance of the input capacitor, a reference voltage of the analogue to digital unit and a data bit of the analogue to digital unit comprises: using a saw-tooth wave to generate the compensation current, (i) calculating an amplitude $D_{icmp}$ according to the following expression:

$$D_{icmp} = \frac{\sqrt{2} \times \pi^3 \times f \times C \times V_r \times (2^N - 1)}{4 \times V_{adc\_ref}}$$

wherein C represents the capacitance of the input capacitor, $V_r$ represents the root mean square of the input line voltage, f represents the frequency of the input line voltage, $V_{adc\_ref}$ represents the reference voltage of the analogue to digital unit, and N represents the data bit of the analogue to digital unit;

(ii) calculating a time interval $t_n$ of a current step according to the following expression:

$$t_n = \frac{T_{line}}{2 \times D_{icmp}}$$

wherein $T_{line}$ represents the cycle of the input line voltage; and (iii) dividing the amplitude into $D_{icmp}$ steps at each half of the saw-tooth wave, each step having a corresponding time interval as generated at step (ii).

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

We claim:

1. A PFC control circuit used in a power converting system, the power converting system including an input capacitor, the power converting system configured to receive an input line voltage and generate an output voltage by controlling a power switch, the PFC control circuit comprising:
    an analogue to digital unit, configured to receive a feed forward signal indicative of the input line voltage, to generate a digital voltage signal;
    a cycle calculating unit, configured to receive the digital voltage signal, to calculate a cycle of the input line voltage to generate a cycle signal;
    a compensation current generating unit, configured to receive the cycle signal to generate a compensation current, wherein the compensation current is complementary to a current flowing through the input capacitor;
    a reference current adjust unit, configured to receive the compensation current, to execute an operation on the compensation current and an original reference current signal, to generate an adjusted reference current signal; and
    a PFC controller, configured to receive the adjusted reference current signal and a current sense signal indicative of a current flowing through the power switch, to generate a logical control signal to control the power switch;
    wherein the cycle calculating unit comprises:
        a peak detecting module, configured to receive the digital voltage signal to detect a peak value of the digital voltage signal, and to generate a peak signal;
        a threshold setting module, configured to receive the peak signal to generate a first threshold and a second threshold with close voltage levels with each other, wherein both the first threshold and the second threshold are lower than the peak signal;
        a threshold detecting module, configured to receive the first threshold and the second threshold, and configured to receive the digital voltage signal, to generate a trig signal when the digital voltage signal at its right half cycle is between the first threshold and the second threshold; and a time counter module, configured to receive the trig signal to generate the cycle signal, wherein a time interval of successive two beings between the first threshold and the second threshold of the digital voltage signal at its right half cycle is the cycle of the input line voltage.

2. The PFC control circuit of claim 1, wherein the reference current adjust unit comprises an operation unit.

3. The PFC control circuit of claim 1, wherein the compensation current generating unit comprises:

a quasi-sine wave amplitude calculating module, configured to calculate an amplitude $D_{imcp}$ according to following expression (a), wherein C represents a capacitance of the input capacitor, $V_r$ represents a root mean square of the input line voltage, f represents a frequency of the input line voltage, $V_{adc\_ref}$ represents a reference voltage of the analogue to digital unit, and N represents a data bit of the analogue to digital unit:

$$D_{icmp} = 2 \times \pi \times f \times C \times \sqrt{2} \times V_r \times \frac{2^N - 1}{V_{adc\_ref}}; \quad (a)$$

a storage module, configured to receive the amplitude and a current step n, to provide a circular function value according to following expression (b)

$$\frac{\arccos\left(\frac{D_{icmp} - n}{D_{icmp}}\right) - \arccos\left(\frac{D_{icmp} + 1 - n}{D_{icmp}}\right)}{\pi}; \quad (b)$$

an operation module, configured to receive the circular function value and the cycle signal, to calculate a time interval of the current step;

a timing module, configured to receive the time interval of the current step, to generate a pulse signal after timing for the time interval of the current step;

a counting module, configured to receive the pulse signal to generate the current step; and a subtract module, configured to receive the amplitude and the current step, to generate the compensation current by executing a subtract operation on the amplitude and the current step.

4. The PFC control circuit of claim 1, wherein the compensation current generating unit comprises:

a saw-tooth wave amplitude calculating module, configured to generate an amplitude $D_{icmp}$ according to following expression (c), wherein C represents a capacitance of the input capacitor, $V_r$ represents a root mean square of the input line voltage, f represents a frequency of the input line voltage, $V_{adc\_ref}$ represents a reference voltage of the analogue to digital unit, and N represents a data bit of the analogue to digital unit:

$$D_{icmp} = \frac{\sqrt{2} \times \pi^3 \times f \times C \times V_r \times (2^N - 1)}{4 \times V_{adc\_ref}}; \quad (c)$$

an operation module, configured to receive the amplitude and the cycle signal, to calculate a time interval $t_n$ of a step according to following expression (d), wherein $T_{line}$ represents the cycle of the input line voltage:

$$t_n = \frac{T_{line}}{2 \times D_{icmp}}; \quad (d)$$

a timing module, configured to receive the time interval of each step, to generate a pulse signal after timing for the time interval of each step;

a counting module, configured to receive the pulse signal to generate current step; and a subtract module, configured to receive the amplitude and the current step, to generate the compensation current by executing subtract operation on the amplitude and the current step.

5. The PFC control circuit of claim 4, wherein the operation module comprises a multiplier.

6. A digital PFC circuit, comprising:

a first input port and a second input port, configured to receive an input line voltage;

a rectifier, coupled to the first input port and the second input port to rectify the input line voltage to a rectified voltage;

an input capacitor, coupled between the rectifier and a reference ground;

a power switch circuit including at least a power switch, wherein the power switch circuit is coupled to the rectifier to receive the rectified voltage, and to generate a desired output voltage;

an analogue to digital unit, configured to receive a feed forward signal indicative of the input line voltage, to generate a digital voltage signal;

a cycle calculating unit, configured to receive the digital voltage signal to calculate a cycle of the input line voltage to generate a cycle signal;

a compensation current generating unit, configured to receive the cycle signal to generate a compensation current, wherein the compensation current is complementary to a current flowing through the input capacitor;

a reference current adjust unit, configured to receive the compensation current, to execute an operation on the compensation current and an original reference current signal, to generate an adjusted reference current signal; and a PFC controller, configured to receive the adjusted reference current signal and a current sense signal indicative of a current flowing through the power switch circuit, to generate a logical control signal to control the power switch; wherein the cycle calculating unit comprises:

a peak detecting module, configured to receive the digital voltage signal to detect a peak value of the digital voltage signal, and to generate a peak signal;

a threshold setting module, configured to receive the peak signal to generate a first threshold and a second threshold with close voltage levels with each other, wherein both the first threshold and the second threshold are lower than the peak signal;

a threshold detecting module, configured to receive the first threshold and the second threshold, and configured to receive the digital voltage signal, to generate a trig signal when the digital voltage signal at its right half cycle is between the first threshold and the second threshold; and a time counter module, configured to receive the trig signal to generate the cycle signal, wherein a time interval of successive two beings between the first threshold and the second threshold of the digital voltage signal at its right half cycle is the cycle of the input line voltage.

7. The digital PFC circuit of claim 6, wherein the compensation current generating unit comprises:

a quasi-sine wave amplitude calculating module, configured to calculate an amplitude $D_{icmp}$ according to following expression (a), wherein C represents a capacitance of the input capacitor, $V_r$ represents a root mean square of the input line voltage, f represents a frequency of the input line voltage, $V_{adc\_ref}$ represents a reference voltage of the analogue to digital unit, and N represents a data bit of the analogue to digital unit:

$$D_{icmp} = 2 \times \pi \times f \times C \times \sqrt{2} \times V_r \times \frac{2^N - 1}{V_{adc\_ref}}; \quad (a)$$

a storage module, configured to receive the amplitude and a current step n, to provide a circular function value according to following expression (b)

$$\frac{\arccos\left(\frac{D_{icmp} - n}{D_{icmp}}\right) - \arccos\left(\frac{D_{icmp} + 1 - n}{D_{icmp}}\right)}{\pi}; \quad (b)$$

an operation module, configured to receive the circular function value and the cycle signal, to calculate a time interval of the current step;

a timing module, configured to receive the time interval of the current step, to generate a pulse signal after timing for the time interval of the current step;

a counting module, configured to receive the pulse signal, to generate the current step n; and a subtract module, configured to receive the amplitude and the current step, to generate the compensation current by executing subtract operation on the amplitude and the current step.

8. The digital PFC circuit of claim 6, wherein the compensation current generating unit comprises:

a saw-tooth wave amplitude calculating module, configured to generate an amplitude $D_{icmp}$ according to following expression (c), wherein C represents a capacitance of the input capacitor, $V_r$ represents a root mean square of the input line voltage, f represents a frequency of the input line voltage, $V_{adc\_ref}$ represents a reference voltage of the analogue to digital unit, and N represents a data bit of the analogue to digital unit:

$$D_{icmp} = \frac{\sqrt{2} \times \pi^3 \times f \times C \times V_r \times (2^N - 1)}{4 \times V_{adc\_ref}}; \quad (c)$$

an operation module, configured to receive the amplitude and the cycle signal, to calculate a time interval $t_n$ of a step according to following expression (d), wherein $T_{line}$ represents the cycle of the input line voltage:

$$t_n = \frac{T_{line}}{2 \times D_{icmp}}; \quad (d)$$

a timing module, configured to receive the time interval of each step, to generate a pulse signal after timing for the time interval of each step;

a counting module, configured to receive the pulse signal to generate a current step; and a subtract module, configured to receive the amplitude and the current step, to generate the compensation current by executing subtract operation on the amplitude and the current step.

9. The PFC control circuit of claim 8, wherein the operation module comprises a multiplier.

10. The PFC control circuit of claim 6, wherein the reference current adjust unit comprises a sum mator.

11. A method used in a digital PFC circuit, the digital PFC circuit having an input capacitor and a power switch circuit, the method comprising:

receiving a feed forward signal indicative of an input line voltage, and converting the feed forward signal to a digital voltage signal via an analogue to digital unit;

detecting a peak value of the digital voltage signal;

setting a first threshold and a second threshold with close voltage levels based on the digital voltage signal, wherein the first threshold and the second threshold are both lower than the peak value of the digital voltage signal;

calculating a time interval of successive two beings between the first threshold and the second threshold of the digital voltage signal at its right half cycle, to get a cycle of the input line voltage;

generating a compensation current complementary to a current flowing through the input capacitor in light of the cycle of the input line voltage, a root mean square of the input line voltage, a frequency of the input line voltage, a capacitance of the input capacitor, a reference voltage of the analogue to digital unit and a data bit of the analogue to digital unit;

adding the compensation current to an original reference current signal to generate an adjusted reference current signal; and controlling a current flowing through the power switch circuit to be proportional to the adjusted reference current signal.

12. The method of claim 11, wherein generating a compensation current complementary to a current flowing through the input capacitor in light of the cycle of the input line voltage, a root mean square of the input line voltage, a frequency of the input line voltage, a capacitance of the input capacitor, a reference voltage of the analogue to digital unit and a data bit of the analogue to digital unit comprises:

using a quasi-sine wave to generate the compensation current:

(i) calculating an amplitude $D_{icmp}$ according to following expression (a):

$$D_{icmp} = 2 \times \pi \times f \times C \times \sqrt{2} \times V_r \times \frac{2^N - 1}{V_{adc\_ref}} \quad (a)$$

wherein C represents the capacitance of the input capacitor, $V_r$ represents the root mean square of the input line voltage, f represents the frequency of the input line voltage, $V_{adc\_ref}$ represents the reference voltage of the analogue to digital unit, and N represents the data bit of the analogue to digital unit;

(ii) calculating a time interval $t_n$ of a current step according to following expression (e):

$$t_n = \frac{\arccos\left(\frac{D_{icmp}-n}{D_{icmp}}\right) - \arccos\left(\frac{D_{icmp}+1-n}{D_{icmp}}\right)}{\pi} \times T_{line}(n=1\ldots D_{icmp}) \quad (e)$$

wherein $T_{line}$ represents the cycle of the input line voltage, and n represents the current step; and (iii) dividing the amplitude into $D_{icmp}$ steps at each half of the quasi-sine wave, each step having a corresponding time interval as generated at step (ii).

13. The method of claim 11, wherein generating a compensation current complementary to a current flowing through the input capacitor in light of the cycle of the input line voltage, a root mean square of the input line voltage, a frequency of the input line voltage, a capacitance of the input capacitor, a reference voltage of the analogue to digital unit and a data bit of the analogue to digital unit comprises: using a saw-tooth wave to generate the compensation current:

(i) calculating an amplitude $D_{icmp}$ according to following expression (c):

$$D_{icmp} = \frac{\sqrt{2} \times \pi^3 \times f \times C \times V_r \times (2^N - 1)}{4 \times V_{adc\_ref}} \quad (c)$$

wherein C represents the capacitance of the input capacitor, $V_r$ represents the root mean square of the input line voltage, f represents the frequency of the input line voltage, $V_{adc\_ref}$ represents the reference voltage of the analogue to digital unit, and N represents the data bit of the analogue to digital unit;

(ii) calculating a time interval $t_n$ of a current step according to following expression (d):

$$t_n = \frac{T_{line}}{2 \times D_{icmp}} \quad (d)$$

wherein $T_{line}$ represents the cycle of the input line voltage, and n represents the current step; and (iii) dividing the amplitude into $D_{icmp}$ steps at each half of the saw-tooth wave, each step having a corresponding time interval as generated at step (ii).

* * * * *